(12) United States Patent
Klabunde et al.

(10) Patent No.: US 12,531,196 B2
(45) Date of Patent: Jan. 20, 2026

(54) SPRING ACTUATED FLOAT SWITCH

(71) Applicant: Alderon Industries, LLC, Hawley, MN (US)

(72) Inventors: Robert Gordon Klabunde, Frazee, MN (US); Alexander Richard Guetter, Detroit Lakes, MN (US)

(73) Assignee: ALDERON INDUSTRIES, LLC, Hawley, MN (US)

( * ) Notice: Subject to any disclaimer, the term of this patent is extended or adjusted under 35 U.S.C. 154(b) by 362 days.

(21) Appl. No.: 18/309,346

(22) Filed: Apr. 28, 2023

(65) Prior Publication Data

US 2023/0352256 A1    Nov. 2, 2023

Related U.S. Application Data

(60) Provisional application No. 63/336,523, filed on Apr. 29, 2022.

(51) Int. Cl.
*H01H 35/18* (2006.01)

(52) U.S. Cl.
CPC ................. *H01H 35/186* (2013.01)

(58) Field of Classification Search
CPC .................................................. H01H 35/186
See application file for complete search history.

(56) References Cited

U.S. PATENT DOCUMENTS

| | | | | |
|---|---|---|---|---|
| 4,644,117 A | * | 2/1987 | Grimes | H01H 35/186 417/40 |
| 5,728,987 A | * | 3/1998 | Utke | H01R 13/585 200/84 R |
| 6,140,925 A | | 10/2000 | Lee et al. | |

* cited by examiner

*Primary Examiner* — Vanessa Girardi
(74) *Attorney, Agent, or Firm* — Fredrikson & Byron, P.A.

(57) ABSTRACT

A float switch assembly for use in actuating a switch to operate a pump to control the level of a fluid in a tank. A float switch assembly for operating a pump to control the level of a fluid in a tank based in part on the angle of the float switch caused by the varying fluid level. A system for controlling a level of a fluid in a tank, the system including a pump fluidly coupled to the tank and configured to pump the fluid from the tank to lower the level of the fluid in the tank.

18 Claims, 7 Drawing Sheets

SPRING ACTUATED FLOAT SWITCH

TECHNICAL FIELD

The various embodiments described herein relate to float switches and float switch assemblies for use in actuating a switch to operate a pump. More particularly, embodiments described herein relate to float switches and float switch assemblies for operating a pump to control the level of a fluid in a tank based in part on the angle of the float switch caused by the varying fluid level.

BACKGROUND

Float switches have been used to control the operation of pumps associated with fluid in a tank. For example, a pump may be turned on in response to a float switch indicating a high level of fluid in a tank, and/or the pump may be turned off in response to the float switch indicating a low level of fluid in the tank.

Mercury has been used in the past in conjunction with float switches, but the use of mercury is not favored due to environmental concerns. Thus, a need for improved float switches exists.

SUMMARY

A float switch is herein described for controlling a pump to vary a level of a fluid in a tank. In some embodiments, the float switch comprises a housing disposed at a distal end of a tether, the housing configured to float at the surface of a fluid in a tank. The tether and the housing move together to form an angle relative to the surface of the fluid in response to changes in the level of fluid in the tank. An electrical switch assembly is disposed within the housing, the electrical switch comprising electrical contacts that are either in an open position or a closed position. In the closed position, the electrical contacts complete an electrical circuit such that electrical power is delivered to the pump to operate the pump. In the open position, the circuit is open, and no power is delivered to the pump.

An example spring actuated float switch may include a plastic float housing containing an electrical switch mechanism connected to a 2-conductor power cable. A typical electrical circuit might employ a power source that connects the first power source lead in series with the first contact of the float switch, and the second contact of the float switch would be connected to a pump motor load first terminal. The pump motor load second terminal is connected to the second power source lead to thereby complete the electrical circuit. When the float switch first and second contacts are connected, there is electrical power delivered to the pump. A typical application is to use a float switch in conjunction with a pump to empty a tank when a fluid level reaches a certain high level, and to automatically turn the pump off when the tank is empty or at some predetermined low level. As the water level rises, the float switch will begin tilting upward, and at a certain angle (e.g., a specified high level), a ball (e.g., spherical) disposed within the housing of the float switch is caused to move by gravity acting on the weight of the ball. The movement of the ball will cause a set of electrical contacts to activate (e.g., close an associate electrical circuit) and turn on power to the pump. While the pump is running, the water level in the tank lowers until a predetermined angle of the float switch housing is reached (e.g., corresponding to a desired low fluid level in the tank). At the predetermined angle, the ball will move and cause the electrical contacts to de-activate and turn off power to the pump.

When the float switch is installed in an empty tank, the float switch housing will tend to be in a downward position (e.g., a downward angle of the housing). The spherical ball in the float switch housing will be disposed in a "Switch Off Ball Containment Area," for example. While in this position, the weight of the spherical ball may press against a "Lever" or "Switch Contact Break Lever" and cause the lever to move and thereby cause a "Pivot Arm" or "Armature Contact Lever" to pivot slightly (e.g., counterclockwise in some embodiments). A "Flat Spring" or "Flat Spring Contact Armature" may extend into the Armature Contact Lever and make contact with a first tab of the Armature Contact Lever. While in this position, the Armature Contact Lever causes the electrical contacts to be in the "Open" position by pulling the Flat Spring Contact Armature away from the "Stationary Electrical Contact." At this point, the Armature Contact Lever has two spring forces acting on the lever: the first spring being an extension spring connected to the Armature Contact Lever and to an internal post within the float switch housing, and the second spring being from the Flat Spring Contact Armature, which has one end fixed within the float switch housing by an internal float post.

As the water level in the fluid tank rises, the float switch housing will rise and reach a certain angle where gravity acts on the spherical ball within the float switch housing, causing the ball to cross over the Ball Angle Barrier and rest in a Switch On Ball Containment Area. While the ball is moving away from the electrical contacts, it releases its force against the Switch Contact Break Lever. This allows the stored spring potential energy to be converted to moving kinetic energy and causes the Armature Contact Lever to pivot, causing the movable contact to come in contact with the Stationary Contact. This electrical contact completes the circuit, activates the switch, allows electricity to flow, and turns on the pump, thereby lowering the fluid level in the tank. When the contacts are closed, a wiping contact motion at the point of contact between the movable and stationary contacts may occur. This may happen due to the kinetic energy of the springs causing the Armature Contact Lever to act on the flat spring, which is a flexible element. Since the flat spring is flexible, it may move when the movable contact first makes contact with the stationary contact. This movement may cause a small wiping action that can clear debris and contaminants on the surfaces of the electrical contacts, which may facilitate ensuring good electrical conductivity for starting the pump.

As the water level lowers, the float switch housing will lower and reach a certain angle where gravity acting on the spherical ball within the housing will cause the ball to cross over the Ball Angle Barrier and rest in the "Switch Off Ball Containment Area." While the ball is first moving into this area, it will make contact with the Switch Contact Break Lever, causing the lever to move and/or pivot, and to thereby cause the Armature Contact Lever to pivot or rotate slightly. The Flat Spring Contact Armature extending into the Armature Contact Lever will be moved by a first tab of the Armature Contact Lever, thereby causing the electrical contacts to move apart to an "Open" position. Power to the pump will be interrupted, and the pump will stop pumping.

In some aspects, the "Activation Angle" of the float switch may be adjusted by installing or changing Angle Barrier Collars. One or both collars may be used to create different "ON" and "OFF" angles for activating the pump. The one or more angle barrier collars change the height of the Ball Angle Barrier, enabling the ability to vary the pump "On" and "Off" levels. These modifications can make the float switch described herein desirable for use in relatively small fluid tanks, or in applications requiring smaller pump ranges, for example.

In some embodiments, the electrical switch comprises a ball configured to move within a channel defined within the housing. Movement of the ball within the channel is determined by gravity in conjunction with the angle of the housing. Movement of the ball within the channel may be further affected by barriers within the channel that affect the angle at which the ball may move from one end of the channel to the other end of the channel. Movement of the ball within the channel is configured to cause the electrical contacts to be in the open position when the ball is at a first end of the channel and is configured to cause the electrical contacts to be in the closed position when the ball is at a second end of the channel. In some embodiments, the ball has a weight that is designed to overcome a biasing mechanism that biases the electrical contacts towards either the open position or the closed position.

Although certain embodiments have been herein described, it is contemplated that other embodiments and/or modifications may be made without departing from the concepts captured by the disclosed embodiments. The foregoing description is intended to be illustrative of certain embodiments and not limiting, and the scope of the disclosure shall be determined by reference to the claims.

DETAILED DESCRIPTION

Figure 1A:
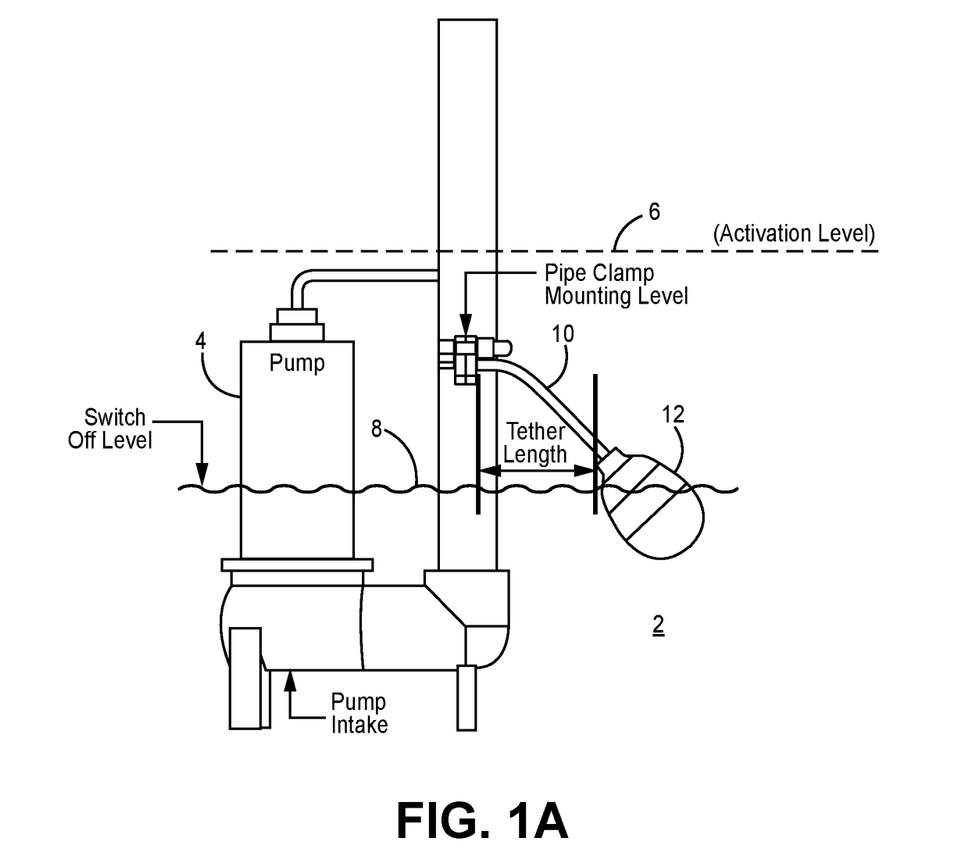
FIGS. 1A and 1B are side views of a float switch system for operating a pump to control the level of a fluid in a tank, according to some embodiments.

FIG. 1A shows an example of an environment in which a float switch according to some embodiments of this disclosure may be employed. For example, fluid tank 2 has an associated pump 4 that can operate to pump fluid from the tank 2 to reduce the level of the fluid in the tank 2 from a high level 6 to a low level 8, then turn off pump 4 until the level again reaches the high level 6. Float switch 12 is configured to float at or near the level of the surface of the fluid in the tank, and is further configured to move up and down with changes in the fluid level in the tank 2. In some embodiments, a tether 10 may be coupled to the float switch 12 at a distal end of the tether 10, and the proximal end of the tether 10 may be operably and/or pivotably coupled at a substantially fixed level in the tank 2, such that the tether 10 and housing 14 of float switch 12 are configured to be disposed at an angle with respect to the surface of the fluid in the tank 2, the angle varying with changes in the fluid level in the tank 2. For example, a certain angle formed by the float switch 12 and tether 10 with respect to the level of the fluid in the tank 2 generally corresponds to a certain level of fluid in the tank 2.

Figure 1B:
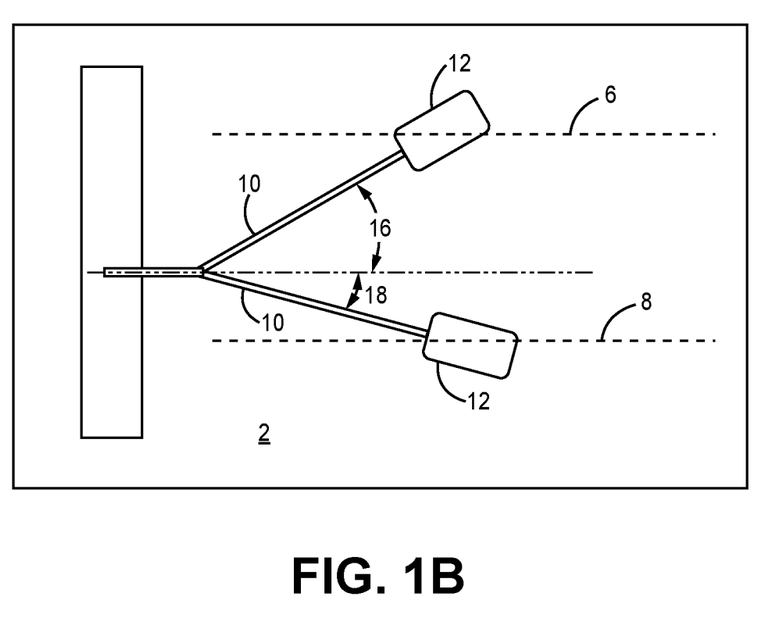

FIG. 1B illustrates a high level angle 16 that may correspond to the fluid level in the tank 2 being at the high level 6 setpoint, and a low level angle 18 that may correspond to the fluid level being at a low level 8 setpoint, for example. As illustrated in FIG. 1B, high level angle 16 is a positive angle or upward angle, and low level angle 18 is a negative angle or downward angle, but other combinations and/or possibilities exist. For example, both angles could be positive (upward), or both could be negative (downward), and they need not be of the same magnitude. This might be accomplished, for example, by forming an upward or downward bend in the tether 10 so that the angle of the housing 14 is not the same as the angle of the tether 10.

The high level angle 16 may, for example, be set to be an upward angle of anywhere from +5 degrees to +85 degrees, and the low level angle 18 may, for example, be set to be a downward angle of anywhere from −5 degrees to −85 degrees. More typically, the high level and low level angles 16 and 18, respectively, may be closer to +45 and −45 degrees, respectively. In some embodiments, it may be desirable to set a switching differential between the high level and low level angles 16 and 18, respectively, for example a 90 degree switching differential may correspond to high level and low level angles 16 and 18 of +45 and −45 degrees, respectively, according to some embodiments. A switching differential of 50 degrees, for example, may correspond to high level and low level angles 16 and 18 of +30 and −20 degrees, respectively, according to some embodiments.

Figure 2A:
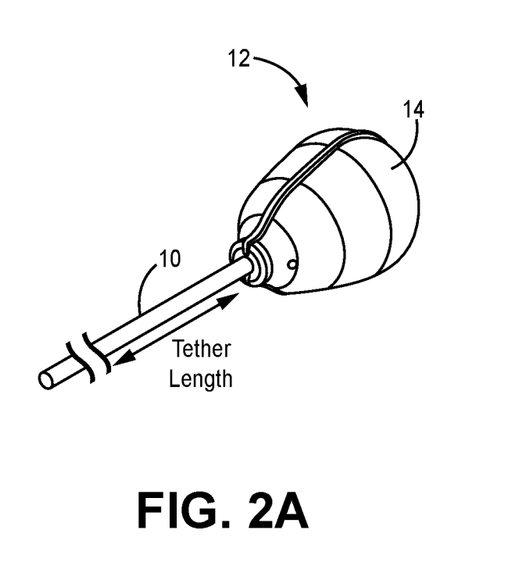
FIG. 2A is a perspective view of a float switch and a tether for use in the system of FIGS. 1A and 1B for operating a pump to control the level of a fluid in a tank, according to some embodiments.
Figure 2B:
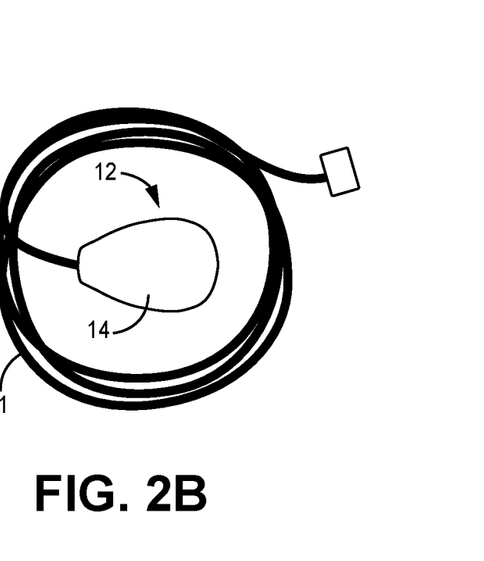
FIG. 2B is a top perspective view of a float switch coupled to an electrical power supply cord for operating a pump to control the level of a fluid in a tank, according to some embodiments.

FIG. 2A illustrates a tether 10 coupled to float switch 12 at a proximal end of the float switch housing 14. Tether 10 may be elongate, such as an elongate cylindrical shape, having a proximal end and a distal end. A distal end of the tether 10 is shown coupled to the proximal end of the float switch housing 14, and a proximal end of the tether 10 extends proximally from the float switch housing along a generally straight portion of the tether 10. In some embodiments, the tether 10 may house electrical cables for supplying power to the pump 4. In some embodiments, the tether 10 may comprise a relatively rigid distal portion of an otherwise flexible cable. For example, FIG. 2B depicts an embodiment of a float switch 12 coupled to a distal end of a flexible power cable 11. The tether 10 may comprise the distal end portion of the flexible power cable 11, or tether 10 may comprise a generally straight, rigid end portion of the flexible power cable 11. Tether 10 could, for example, be formed by adding a length of plastic tubing around the distal end of the flexible power cable 11, according to some embodiments. Tether 10 may house electrical power supply cables or portions thereof. The length of tether 10 may range from 1 inch to over 3 feet in length (depending on the size of the tank, for example), and is preferably between about 3" and 24" in length, according to some embodiments.

Figure 3A:
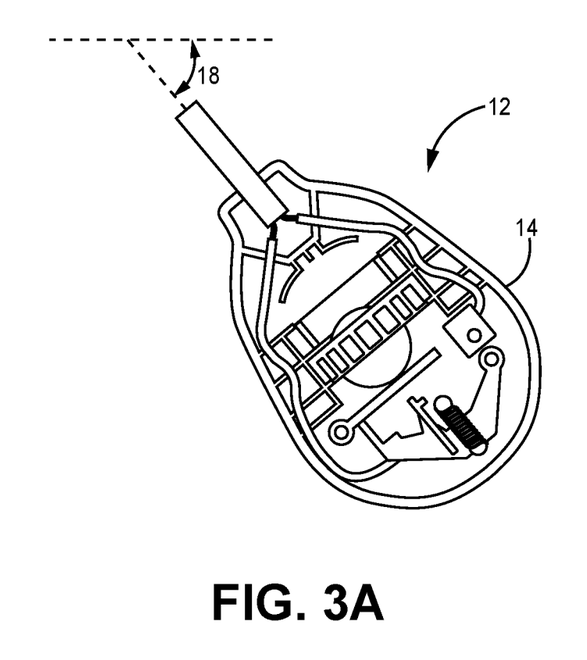
FIGS. 3A and 3B are side cross-sectional views of a float switch in a configuration corresponding to a low fluid level in a tank, according to some embodiments.
Figure 3B:
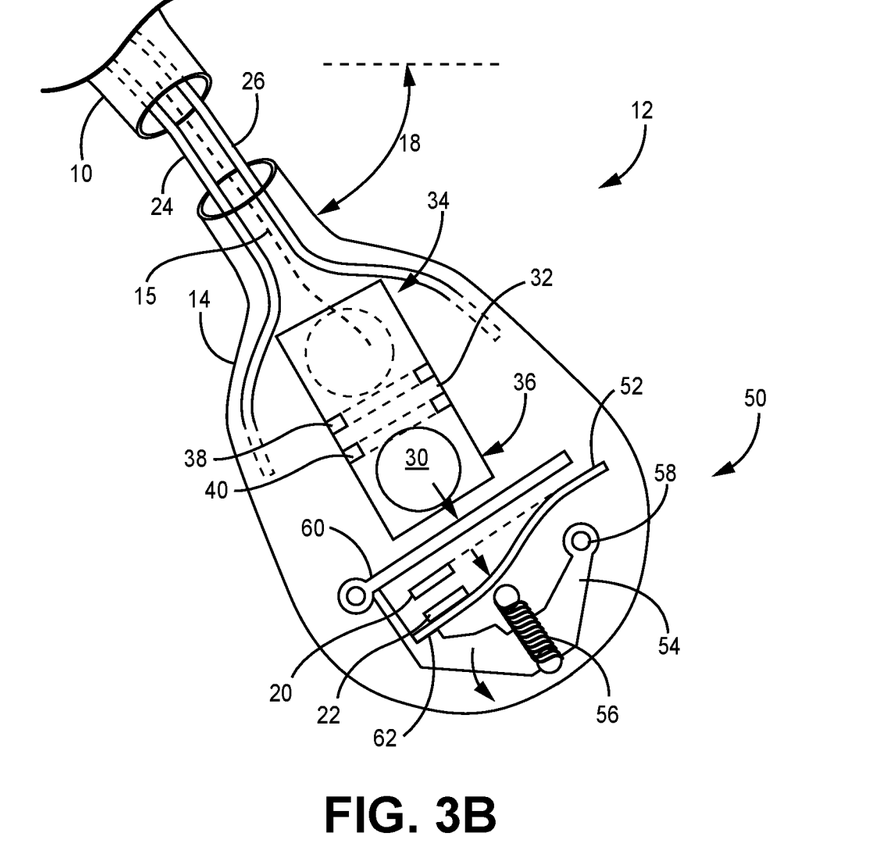

FIGS. 3A and 3B are side cut-away views of a float switch 12 as it might appear when disposed at or near a low level setpoint 8 in the tank 2, for example, angled downwardly at an angle 18 as shown in FIGS. 3A and 3B. Float switch 12 comprises a housing 14 that has a generally annular shape. For example, housing 14 may extend along an axis 15 from a proximal end to a distal end of the housing 14. Housing 14 is generally hollow in construction to house a number of switch components within. Housing 14 may be formed of a plastic material such that it will be buoyant in the fluid environment for which it is intended to operate. That is, housing 14 is generally configured to float at or near a surface level of the fluid in the tank 2. Housing 14 may be formed of multiple pieces fit or fastened together, e.g., two halves that are fastened together. An example of a suitable plastic material for forming housing 14 includes polypropylene, although many similar suitable alternative materials may be used as well.

Float switch 12 further comprises first and second electrical contacts 20, 22 disposed with housing 14, the electrical contacts 20 and 22 being configured to move with respect to each other such that they are in one of two positions: (1) a closed position, where the electrical contacts 20 and 22 are in electrical contact with each other to complete an electrical circuit, or (2) an open position, where the electrical contacts 20 and 22 are physically separated from each other to interrupt or break the electrical circuit path. In the closed position, the electrical circuit is completed to enable delivery of electrical power to pump 4. In the embodiment shown in FIGS. 3A and 3B, there is a stationary electrical contact 20, and a movable electrical contact 22. However, it is contemplated that both electrical contacts could be movable, or that the relative positions of the movable and stationary electrical contacts could be reversed, etc. Electrical power supply lines 24 and 26 are shown entering the housing 14 via an insulated housing, which may be the distal end of tether 10 according to some embodiments. If the electrical contacts 20 and 22 are in the closed position, an electrical circuit would be completed from power supply line 24, which is electrically coupled to contact 20, through contact 22, which in turn is electrically coupled to power supply line 26, completing the electrical circuit and enabling electrical power to be supplied/delivered to the pump 4. If instead, the electrical contacts 20 and 22 are in the open position (as depicted in FIG. 3), the electrical circuit would be broken by the gap between the electrical contacts 20 and 22, and electrical power would not be delivered to the pump 4.

FIGS. 3A and 3B are cut-away side views of float switch 12 showing details of an electrical switch assembly disposed within housing 14 of float switch 12. The electrical switch assembly may comprise a ball 30 disposed within a channel 32 formed within housing 14. The channel 32 may be configured to be generally aligned with or generally parallel to the axis 15 of the housing 14. Channel 32 is sized and/or shaped to allow slidable and/or rolling movement of ball 30 within channel 32. Ball 30 may be a spherical ball 30 such that gravity causes rolling and/or sliding movement of ball 30 within channel 32. Channel 32 extends within the housing 14 to thereby enable movement of the ball 30 within the channel 32, for example, from a first position at or near a more distal portion 36 of the channel 32 to a second position at or near a more proximal portion 34 of the channel 32 in response to the angle of the housing 14 reaching and/or exceeding a first threshold angle, for example reaching the high level angle 16 corresponding to the fluid level in the tank 2 being at or above the high level 6 setpoint. High level angle 16 may typically be an upward angle (e.g., where the housing 14 and tether 10 are above the level at which the tether 10 is pivotably coupled within the tank 2), but it need not be an upward angle. Conversely, movement of the ball 30 within the channel 32 may be from the second position at or near the more proximal portion 34 of the channel 32 to the first position at or near the more distal portion 36 of the channel 32 in response to the angle of the housing 14 reaching and/or falling below a second threshold angle, for example reaching the low level angle 18 corresponding to the fluid level in the tank 2 being at or below the low level 8 setpoint. Low level angle 18 may typically be a downward angle (e.g., where the housing 14 and tether 10 are below the level at which the tether 10 is pivotably coupled within the tank 2), but it need not be an downward angle.

In some embodiments, channel 32 may include one or more ball angle barriers to control and/or adjust the angle at which the ball 30 moves from the first position to the second position, or from the second position to the first position. For example, a ball angle barrier, such as angle barriers 38 and/or 40 shown in FIGS. 3A and 3B, may comprise a portion of the channel 32 with a somewhat restricted path (e.g., a reduced inner radius) so as to provide a relatively small barrier to the ball 30 and keep the ball 30 from constantly moving within the channel 32, especially when the fluid level in the tank 2 is such that the angle of the housing 14 is close to horizontal. The ball angle barriers 38, 40 therefore function so that the angle of the housing 14 relative to the surface level of the fluid in the tank 2 must be greater than a certain threshold angle (either upward or downward) before the ball 30 will overcome (e.g., roll over) the one or more angle barriers 38 and/or 40 and move from one position within the channel 32 to the other. The at least one angle barrier can thereby provide a form of hysteresis in the functioning of the float switch mechanism to avoid unnecessarily frequent switching of the pump 4 off and on when there are relatively small changes in the angle of the housing 14, for example when the housing 14 is nearly horizontal. In some embodiments, it may suffice to have a single angle barrier 38 or 40 positioned between the proximal portion 34 of the channel 32 and the distal portion 36 of the channel 32 (e.g., roughly mid-way). In other embodiments, it may be desirable to have two angle barriers 38 and 40 disposed within the channel 32, for example to separately control and/or individually vary the high level angle 16 differently from the low level angle 18. In some embodiments, the one or more angle barriers 38, 40 may comprise one or more angle barrier collars 38, 40 (as depicted in FIGS. 3A and 3B) that may facilitate making adjustments to the high level and/or low level angles 16 and 18 respectively, for example. This could be accomplished, for example, by placement of one or more angle barrier collars 38, 40 with varying inner radii, for example, or by otherwise varying the inner radius of each angle barrier collar 38, 40 such that it forms an adjustable angle barrier collar to enable adjustment of the associated threshold angle.

Angle barrier collars 38, 40 may comprise rings (e.g., plastic rings) having an outer diameter configured to be placed in a slot or channel formed within housing 14, and having an inner diameter configured to effect the desired response, e.g., to vary the associated high level and low level angles 16 and 18. It is contemplated that a plurality of such rings with varying inner diameters could be provided for this purpose. In such an embodiment, for example, housing 14 may be configured to open into two halves to facilitate replacement of the one or more angle barrier collars 38, 40 disposed within housing 14.

An exemplary biasing mechanism 50 is also depicted in FIGS. 3A and 3B. Biasing mechanism 50 may be disposed within housing 14 and may include one or more of the associated elements shown in FIGS. 3A and 3B in various combinations and configurations. Biasing mechanism 50 is configured to bias or urge the first and second electrical contacts 20, 22 toward one of either the open position or the closed position. In the embodiment depicted, biasing mechanism 50 comprises a spring element 52 shown with movable contact 22 coupled to a distal portion of spring element 52 to enable movement of contact 22 relative to stationary contact 20. For example, spring element 52 may comprise a flat spring element 52 fixedly coupled within housing 14 at a proximal end of spring element 52, such that the distal end of flat spring 52 (and hence, the movable contact 22 coupled thereto) can move toward and/or away from stationary contact 20. Flat spring 52 may be a conductive element such that electrical current may pass through flat spring 52 when electrical contacts 20 and 22 are in the closed position, for example. Flat spring element 52 may be biased or tensioned to attempt to maintain contact between electrical contacts 20 and 22 (e.g., in the closed position), and may require a force (e.g., the weight of ball 30 acting directly or indirectly on spring element 52) to move the electrical contacts 20 and 22 apart (e.g., to the open position), as is shown in FIGS. 3A and 3B. Alternately, it is envisioned that the arrangement could be modified to an alternate arrangement (not shown) such that the flat spring element 52 is biased to urge the electrical contacts 20 and 22 apart (e.g., toward the open position), and where a force would be required (e.g., the weight of ball 30 acting directly or indirectly on spring element 52) to move the electrical contacts 20 and 22 towards each other into physical contact (e.g., toward the closed position). The remaining description will focus on the embodiment depicted in FIGS. 3A and 3B, while noting that minor modifications could be made by those of ordinary skill to achieve alternate arrangements, as desired.

In the embodiment depicted in FIGS. 3A and 3B, a second spring element may be used to further bias the electrical contacts 20, 22 toward each other (e.g., toward the closed position). In the embodiment shown, a spring 56 (e.g., a coiled spring 56) is used to bias a pivot arm 54 pivotably coupled within housing 14 at a proximal end about a pivot point 58. Pivot arm 54 may include a notch or slot 62 formed in a distal end of pivot arm 54 to engage and/or bias flat spring 52. For example, spring 56 applies tension to pivot arm 54 to urge pivot arm 54 to rotate in a clockwise direction, which urges flat spring 52 (e.g., via notch/slot 62) to move contact 22 toward the closed position in contact with stationary contact 20 in the embodiment shown. In the embodiment shown in FIGS. 3A and 3B, the downward angle of housing 14 in combination with the weight of ball 30 (e.g., due to gravity) is sufficient to overcome the bias provided by flat spring 52 and spring 56, resulting in the electrical contacts 20 and 22 being held in the open position. In some embodiments, a lever 60 may be employed to cause the weight of ball 30 to act upon the pivot arm 54, as shown in FIGS. 3A and 3B. For example, the weight of ball 30 acting against lever 60 may cause lever 60 to move downward and/or pivot about a pivot point, as shown in FIGS. 3A and 3B for example, with lever 60 thereby pushing against a distal portion of pivot arm 54, causing pivot arm 54 to pivot in a counter-clockwise direction against the bias of the spring 56 and/or the flat spring 52.

In some embodiments, a further action and/or benefit may be provided by the operation of certain portions of the biasing mechanism 50. For example, the spring bias provided by spring 56 in combination with the use of a relatively flexible flat spring 52 may effectuate a "wiping" motion between contacts 20 and 22 when they are moved into the closed position into contact with each other, and possibly again when they are moved into the open position. This movement may cause a small relative wiping action between contacts 20, 22 that can help clear debris, residue, contaminants, oxidation, etc., that may exist and/or form on the surfaces of the electrical contacts 20, 22. The wiping action created by the two springs elements 52, 56 may thereby facilitate ensuring good electrical conductivity between contacts 20 and 22 to better ensure consistent starting of the pump 4, according to some embodiments.

Figure 4A:
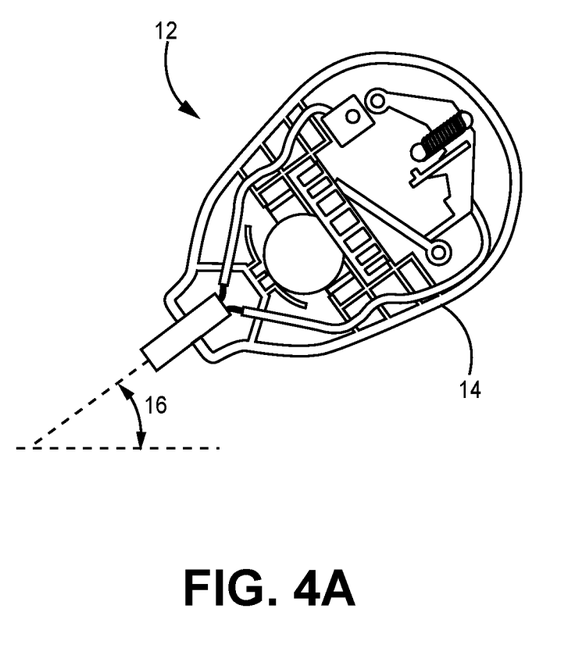
FIGS. 4A and 4B are side cross-sectional views of a float switch in a configuration corresponding to a high fluid level in a tank, according to some embodiments.
Figure 4B:
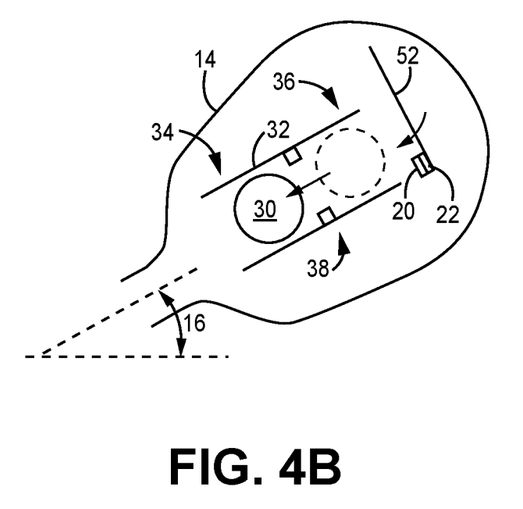

FIGS. 4A and 4B illustrate the operation of float switch 12 when the fluid level in tank 2 rises to a fluid high level 6, and the flotation of float switch 12 in the fluid results in housing 14 being at a high level angle 16 relative to the surface of the fluid in the tank 2. As shown, the high level angle 16 may be sufficient to cause ball 30 to overcome the angle barrier 38 and move to the second position at the more proximal portion 34 of the channel 32. In some embodiments, the high level angle 16 in combination with the bias provided by biasing mechanism 50 enables ball 30 to overcome the angle barrier and move to the second position in channel 32. (Note that a single angle barrier 38 is shown in FIG. 4B to illustrate an embodiment having only one angle barrier collar 38 that could be used to function for both the high level angle 16 and for the low angle 18 settings, according to some embodiments of this disclosure.) When ball 30 moves to the second position at the more proximal portion 34 of the channel 32, the biasing mechanism 50 acts to move the electrical contacts 20 and 22 into contact with each other (e.g., into the closed position), which completes the circuit and enables the delivery of power to the pump 4.

What is claimed is:

1. A system for controlling a level of a fluid in a tank, the system comprising:
   a pump, the pump fluidly coupled to a tank and configured to pump a fluid from the tank to lower a level of the fluid in the tank;
   an electrical power source configured to supply electrical power for operating the pump; and
   a float switch assembly configured to control the electrical power supplied from the electrical power source to the pump, the float switch assembly comprising:
      a housing, the housing configured to float at a surface of the fluid in the tank, the housing being generally annular along an axis extending from a proximal end to a distal end;
      an elongate tether having a proximal end and a distal end, the distal end of the tether coupled to the proximal end of the housing, the tether and housing configured to be disposed at an angle relative to the surface of the fluid in the tank; and
      an electrical switch assembly disposed within the housing, the electrical switch assembly comprising:
         a ball disposed in a channel within the housing, the ball configured to move within the channel from a first position to a second position in response to the angle of the housing reaching a first threshold angle;
         first and second electrical contacts disposed within the housing, the first and second electrical contacts configured to move relative to each other between an open position and a closed position, the closed position comprising electrical contact across the first and second contacts to enable delivery of electrical power to the pump; and
         a biasing mechanism disposed within the housing, the biasing mechanism comprising a flat spring having a first end mounted within the housing, the flat spring configured to bias the first and second electrical contacts toward the closed position, wherein one of the first and second electrical contacts is a stationary contact, wherein the other of the first and second electrical contacts is a movable contact coupled to a second end of the flat spring, and wherein the flat spring is configured to generate a wiping motion between the first and second electrical contacts when the first and second electrical contacts are moved into the closed position,
wherein the ball has a weight sufficient to overcome the bias of the biasing mechanism when in one of the first position and the second position.

2. A float switch for controlling a pump to vary a level of a fluid in a tank, the float switch comprising:
a housing, the housing configured to float at a surface of the fluid in the tank, the housing being generally annular along an axis extending from a proximal end to a distal end;
an elongate tether having a proximal end and a distal end, the distal end of the tether coupled to the proximal end of the housing, the tether and housing configured to be disposed at an angle relative to the surface of the fluid in the tank; and
an electrical switch assembly disposed within the housing, the electrical switch assembly comprising:
a ball disposed in a channel within the housing, the ball configured to move within the channel from a first position to a second position in response to the angle of the housing reaching a first threshold angle;
first and second electrical contacts disposed within the housing, the first and second electrical contacts configured to move relative to each other between an open position and a closed position, the closed position comprising electrical contact across the first and second contacts to enable delivery of electrical power to the pump; and
a biasing mechanism disposed within the housing, the biasing mechanism comprising a flat spring having a first end mounted within the housing, the flat spring configured to bias the first and second electrical contacts toward the closed position, wherein one of the first and second electrical contacts is a stationary contact, wherein the other of the first and second electrical contacts is a movable contact coupled to a second end of the flat spring, and wherein the flat spring is configured to generate a wiping motion between the first and second electrical contacts when the first and second electrical contacts are moved into the closed position,
wherein the ball has a weight sufficient to overcome the bias of the biasing mechanism when in one of the first position and the second position.

3. The float switch of claim 2 wherein the biasing mechanism further comprises a pivot member operably coupled to at least one spring and configured to further bias the first and second electrical contacts toward the closed position, and wherein the weight of the ball overcomes the bias of the biasing mechanism when the ball is in the first position.

4. The float switch of claim 2 further comprising a lever pivotally mounted within the housing, the lever configured to be moved by the ball when the ball moves toward the first position in opposition to the biasing mechanism.

5. The float switch of claim 2 wherein the channel includes a first ball angle barrier to control the first threshold angle.

6. The float switch of claim 5 wherein the first ball angle barrier comprises an adjustable angle barrier collar to vary the first threshold angle.

7. The float switch of claim 2 wherein the first threshold angle is an upward angle, and wherein when the ball moves to the second position in the channel, the first and second electrical contacts move to the closed position to enable delivery of electrical power to the pump.

8. The float switch of claim 7 wherein the ball is further configured to move within the channel from the second position to the first position in response to the angle of the housing reaching a second threshold angle.

9. The float switch of claim 8 wherein the second threshold angle is a downward angle, and wherein when the ball moves to the first position in the channel, the first and second electrical contacts move to the open position to interrupt delivery of electrical power to the pump.

10. The float switch of claim 8 wherein the channel includes a second ball angle barrier to control the second threshold angle.

11. The float switch of claim 10 wherein the second ball angle barrier comprises an adjustable angle barrier collar to vary the second threshold angle.

12. A float switch for controlling a pump to vary a level of a fluid in a tank, the float switch comprising:
a housing, the housing configured to float at a surface of the fluid in the tank, the housing being generally annular along an axis extending from a proximal end to a distal end;
an elongate tether having a proximal end and a distal end, the distal end of the tether coupled to the proximal end of the housing, the tether and housing configured to be disposed at an angle relative to the surface of the fluid in the tank; and
an electrical switch assembly disposed within the housing, the electrical switch assembly comprising:
a ball disposed in a channel within the housing, the ball configured to move within the channel from a first position to a second position in response to the angle of the housing reaching a first threshold angle;
first and second electrical contacts disposed within the housing, the first and second electrical contacts configured to move relative to each other between an open position and a closed position, the closed position comprising electrical contact across the first and second contacts to enable delivery of electrical power to the pump; and
a biasing mechanism disposed within the housing, the biasing mechanism comprising a pivot member operably coupled to at least one spring and configured to bias the first and second electrical contacts toward the closed position,
wherein the ball has a weight sufficient to overcome the bias of the biasing mechanism when the ball is in the first position.

13. The float switch of claim 12 wherein the biasing mechanism further comprises a flat spring having a first end mounted to the housing, the flat spring configured to further bias the first and second electrical contacts toward the closed position, wherein one of the first and second electrical contacts is a stationary contact, and wherein the other of the first and second electrical contacts is a movable contact coupled to a second end of the flat spring.

14. The float switch of claim 13 wherein the flat spring is configured to generate a wiping motion between the first and second electrical contacts when the first and second electrical contacts are moved into the closed position.

15. The float switch of claim 12 wherein the channel includes a first ball angle barrier to control the first threshold angle.

16. The float switch of claim 15 wherein the first ball angle barrier comprises an adjustable angle barrier collar to vary the first threshold angle.

17. The float switch of claim 12 wherein the ball is further configured to move within the channel from the second position to the first position in response to the angle of the housing reaching a second threshold angle, and wherein the channel includes a second ball angle barrier to control the second threshold angle.

18. The float switch of claim 17 wherein the second ball angle barrier comprises an adjustable angle barrier collar to vary the second threshold angle.

* * * * *